Patented Apr. 13, 1954

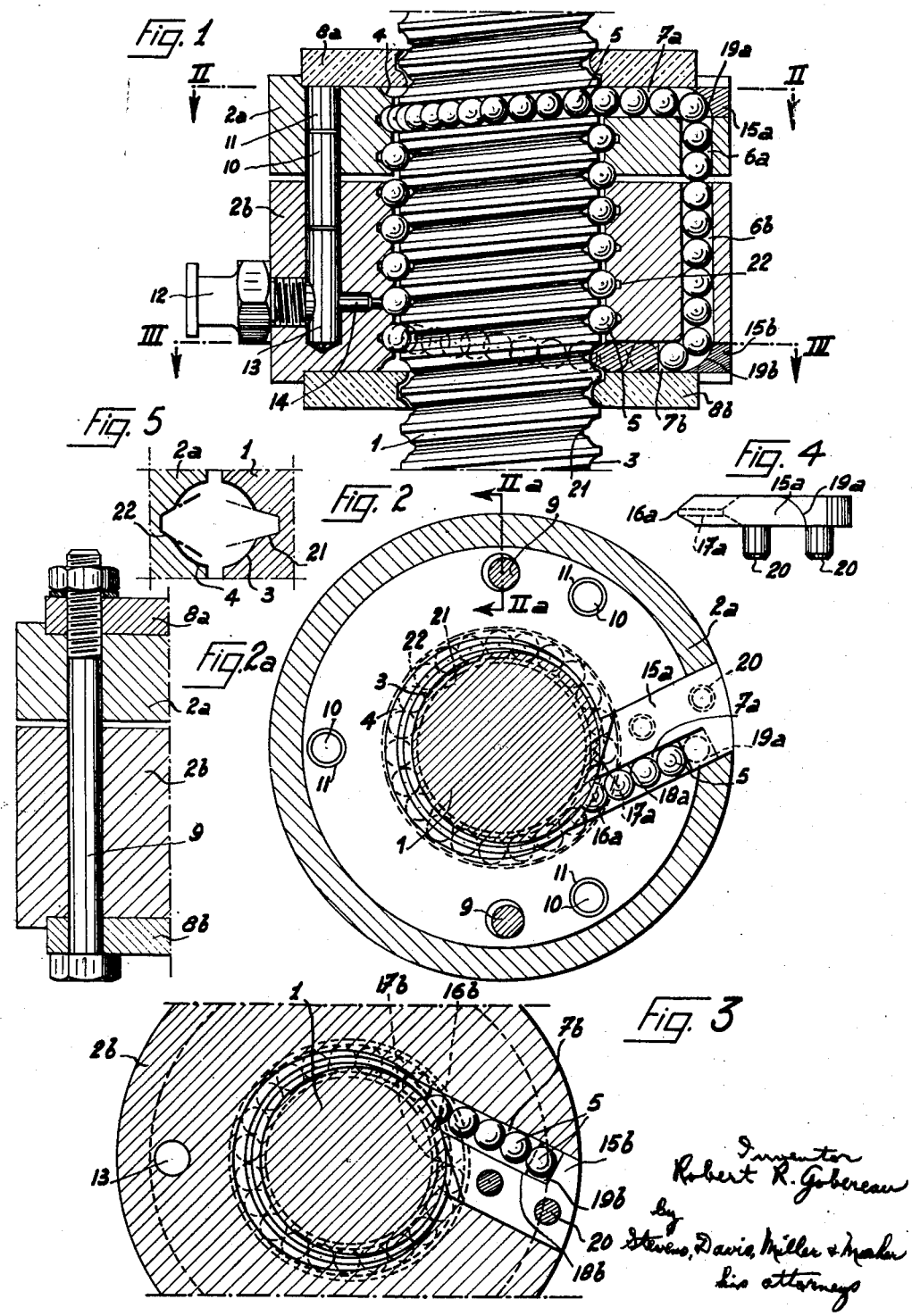

2,674,899

UNITED STATES PATENT OFFICE 2,674,899

SCREW AND NUT ASSEMBLY

Robert R. Gobereau, Paris, France

Application May 3, 1951, Serial No. 224,335

Claims priority, application France January 22, 1951

4 Claims. (Cl. 74—459)

The present invention relates to an improved screw-and-nut device which incorporates the use of rolling elements, preferably balls, between the cooperating threads of the screw and the nut, thereby replacing the usual friction between the screw and nut thread surfaces of conventional screw and nut assemblies by rolling friction, and consequently greatly reducing the force required to displace the screw and nut members relatively to each other under heavy loads.

Objects of the invention include the provision of an improved screw and nut assembly of this kind; the provision of such an assembly which includes features of construction making it simpler to fabricate and smoother in operation. One specific object is to permit adjustment of the operating clearance between the ball elements and the cooperating thread surfaces, thus making it possible to take up wear. This object is attained by providing the nut in two parts divided on a transverse plane, the two parts being assembled together by axially adjustable means so as to allow adjustment of the spacing between said parts and consequently of the operating clearance between the rolling elements and thread surfaces.

A further specific object is to provide an improved return duct through the nut member interconnecting the opposite ends of the continuous helical ball race defined by the screw and nut threads to allow the balls to circulate smoothly in a continuous closed cycle during relative rotation between the screw and nut. According to a feature of the invention, this return duct includes in its end sections in which it merges with the ends of said ball race, a separate insert member which defines one side wall thereof and has a tapering inner nose section projecting into the said ball race substantially into engagement with the radially innermost surface of said ball-race, that is, with the bottom of the screw thread surface, and said nose portion includes one side which is substantially tangent to this surface.

The provision of such a separate insert, which is preferably made of a surface-hardened or similar wear-resisting metal or alloy provides great smoothness in operation because of the increased smoothness with which the balls are allowed to pass through the critical areas at which the return duct merges with the threads in which the balls would otherwise be liable to be jammed.

A further specific object is to improve the rolling friction of the balls with the cooperating thread surfaces and at the same time to facilitate the machining of these surfaces; and for this purpose a continuous recess or groove is formed along the bottom of the thread of each member.

The above and other objects, features and advantages of the invention will appear from the ensuing disclosure in which but one exemplary embodiment of the invention is described for purposes of elucidation and not of limitation with reference to the accompanying drawings wherein Fig. 1 is an axial section of an improved ball-mounted screw and nut assembly according to the invention, Figs. 2 and 3 are transverse sections on lines II—II and III—III respectively of Fig. 1, Fig. 2a is a section on line IIa—IIa of Fig. 2, Fig. 4 is a side view of the upper catch member, and Fig. 5 is a diagrammatic view on an enlarged scale showing in section cooperating parts of the threads of the screw and the nut.

In the exemplary embodiment of the invention illustrated, there is provided a screw 1 and a two-part nut member 2a, 2b having screw-threads of part-circular concave configuration in axial cross-section so that, with the nut and screw relatively positioned for mutual cooperation, the adjacent parts of the respective threads cooperate to provide a complete circle, as shown on a larger scale in Fig. 5. A plurality of balls 5 corresponding in radius to that of this circle are arranged in the continuous helical groove or ball race provided by said cooperating threads, the balls being sufficient in number to provide a substantially continuous or closely spaced array throughout the axial extent of the nut.

It is understood accordingly that there is no actual contact between the nut and the screw, the contact being made through the medium of the balls. Hence, the usual friction contact existing between the screw-thread surface and the nut-thread surface in a conventional screw-and-nut assembly is herein eliminated, and rolling friction is substituted therefor, similar to that occurring in a ball-bearing, so that the operation is correspondingly much smoother and more accurate, even under considerable loads.

The upper and lower ends of the continuous groove provided by the nut thread are interconnected by a duct through which the balls can circulate in a continuous closed circuit as the screw moves relative to the nut or vice versa. This duct is in two sections respectively formed in the parts 2a, 2b of the nut, and includes sections 6a, 6b extending parallel with the axis of the screw and sections 7a, 7b in planes perpendicular to the axis and serving to connect the sections 6a, 6b with the upper and lower end respectively of the nut thread. As shown, for greater convenience in manufacture, the transverse duct sections 7a, 7b may be formed in the end faces of the nut member and thereafter covered over by separately secured end cover plates 8a, 8b. The two nut sections 2a, 2b and the covers 8a, 8b are assembled together by suitable means such as the bolts 9 extending through the assembly. Smooth pins 10 are arranged to slide in complementary smooth ducts 11 formed in angular positions spaced 120° away from each around the nut (see Fig. 2) and serve to centre accurately the nut sections 2a, 2b, while allowing axial adjustment therebetween to vary the clearance gap j between the nut sections 2a, 2b by action upon the assembly bolts 9, whereby the general operating clearance of the screw and nut assembly and the interposed balls may be controlled. The nut sections 2a, 2b may be equal or may differ in axial length. Moreover, as shown, one of the ducts 11 may be used in association with a lubricator 12 to provide within the space 13 therein a supply of lubricating oil or grease from which the grease will gradually penetrate into the screw threads through a duct 14.

Experience shows that an important consideration for a proper operation of the device is that the end sections 7a, 7b of the ball-return duct should merge properly with the nut threads to avoid jamming the balls and eventually breaking them, or at any rate impairing the smooth operation of the device.

For this purpose, according to a feature of the invention, one side wall of each of the duct sections 7a, 7b is provided by a small strip-like member or insert 15a, 15b which is inserted into a recess milled in each of the end faces of the nut and is formed with a bevelled angular nose at its inner end (see Figs. 2 and 3), the tip or apex 16a, 16b of which projects into the screw thread so that one bevelled side, 17a, 17b of the nose is substantially tangent with the bottom of said thread. The side 18a, 18b of the insert member 15a, 15b defines one side wall of the duct 7a, 7b, while the other side wall of the duct, which is spaced from the first-mentioned side by a distance corresponding to the ball diameter, is arranged so as to be tangent to the wall of the aperture in the nut (rather than being tangent to the bottom of the nut thread).

Desirably the insert members 15a, 15b are made of a hardened or surface-treated metal in order to stand up well to the wear occurring under the continual passing of the balls and their reversals in motion, through the ducts 7a, 7b.

The inserts 15a, 15b, in the form of embodiment disclosed, provide the necessary radius over which the longitudinal sections 6a, 6b merge with the respective transverse sections 7a, 7b of the duct. For this purpose, each insert is formed, at its outer end or end opposite from the angular nose 16a, 16b, with an enlargement which is suitably rounded off as at 19a in the axial plane of the device to provide the necessary radius for a smooth connection between the duct sections (see Fig. 4). The inserts 15a, 15b may be simply retained in position by the cover plates 8a, 8b which would of course be provided with suitable apertures for the passage of the screw therethrough, such apertures being large enough to prevent any friction between the screw and the cover plates. Desirably however the insert members 15a, 15b are provided with projecting pins 20 cooperating with holes formed in the nut for accurately positioning the inserts.

According to a particularly desirable feature of the invention the thread both in the screw and in the nut member is formed with a continuous depression or groove 21, 22 in the bottom of the circular thread (see Fig. 5), this depression being advantageously of trapezoidal form in cross-section. It is found that this provision imparts flexibility and greatly enhances the smoothness of rolling operation of the balls in their races and improves the smoothness of the operation of the device as a whole. At the same time, it facilitates the machining of the threads in that the trapezoidal or other recessed part does not require accurate machine finish. Thus the trapezoidal groove may be cut out first, after which the circular ball-race surface is provided in a finishing step using a suitably profiled and-cutter or the like. Quenching or surface hardening operations are also improved.

It will be understood that various alterations may be made in the details of the device described and illustrated without departing from the scope of the invention.

What I claim is:

1. In a device of the kind referred to, including a screw having a continuous helical groove, the combination of a nut member arranged in two successive parts along said screw with an axial clearance between them and having on its inner surface a continuous helical groove corresponding in pitch to the groove in the screw, said nut member having an inner diameter larger than the outer diameter of said screw and having a duct substantially parallel to its axis and a channel provided at each of its ends, each of said channels being connected at one end to said duct and merging at its other end with said nut groove; a series of balls in said duct and channels and in the space defined by said screw and nut grooves, said balls being in rolling interengagement with said grooves; means on said nut member for centering said nut parts relatively to each other in fixed angular relation while allowing axial adjustment therebetween; and axially adjustable assembly means on said nut parts for connecting same and for varying said axial clearance, thereby providing for a control of the looseness between said balls and said screw and nut grooves.

2. In a device of the kind referred to, the combination of a screw having a continuous helical groove with a substantially hemi-circular cross-section and with a slotted bottom in substantially cross-sectional trapezoidal form; a nut member arranged in two successive parts along said screw with an axial clearance between them and having on its inner surface a continuous helical groove substantially equal in shape and size and corresponding in pitch to the groove in the screw, said nut member having an inner diameter larger than the outer diameter of said screw and having a duct substantially parallel to its axis and a channel provided at each of its ends, each of said channels being connected at one end to said duct and merging at its other end with said nut groove; a series of balls in said duct and channels and in the space defined by said screw and nut grooves, said balls being in rolling interengagement with said grooves; means on said nut member for centering said nut parts relatively to each other in fixed angular relation while allowing axial adjustment therebetween; and axially adjustable assembly means on said nut parts for connecting same and for varying said axial clearance, whereby providing for a control of the looseness between said balls and said screw and nut grooves.

3. In a device of the kind referred to, including a screw having a continuous helical groove, the combination of a nut member arranged in two successive parts along said screw with an axial clearance between them and having on its inner surface a continuous helical groove corresponding in pitch to the groove in the screw, said nut member having an inner diameter larger than the other diameter of said screw and having a duct substantially parallel to its axis and a channel provided at each of its ends, each of said channels being connected at one end to said duct and merging at its other end with said nut groove; a series of balls in said duct and channels and in the space defined by said screw and nut grooves, said balls being in rolling interengagement with said grooves; an insert at each end of said nut member, having a lateral surface defining one side wall of each of said channels and being provided with a lateral extension having a rounded surface connecting tangentially the outer surfaces of said duct and of said channel, said insert being provided with a tapered wedge-shaped end portion projecting into said screw groove and including said lateral surface and an end surface substantially tangent to the bottom surface of said screw groove; means on said nut member for centering said nut parts relatively to each other in fixed angular relation while allowing axial adjustment therebetween; and axially adjustable assembly means on said nut parts for connecting same and for varying said axial clearance, whereby providing for a control of the looseness between said balls and said screw and nut grooves.

4. In a device of the kind referred to, the combination of a screw having a continuous helical groove with a substantially hemi-circular cross-section and with a slotted bottom in substantially cross-sectional trapezoidal form; a nut member arranged in two successive parts along said screw with an axial clearance between them and having on its inner surface a continuous helical groove substantially equal in shape and size and corresponding in pitch to the groove in the screw, said nut member having an inner diameter larger than the outer diameter of said screw and having a duct substantially parallel to its axis and a channel provided at each of its ends, each of said channels being connected at one end to said duct and merging at its other end with said nut groove; a series of balls in said duct and channels and in the space defined by said screw and nut grooves, said balls being in rolling interengagement with said grooves; an insert at each end of said nut member, having a lateral surface defining one side wall of each of said channels and being provided with a lateral extension having a rounded surface connecting tangentially the outer surfaces of said duct and of said channel, said insert being provided with a tapered wedge-shaped end portion projecting into said screw groove and including said lateral surface and an end surface substantially tangent to the bottom surface of said screw groove; means on said nut member for centering said nut parts relatively to each other in fixed angular relation while allowing axial adjustment therebetween; and axially adjustable assembly means on said nut parts for connecting same and for varying said axial clearance, whereby providing for a control of the looseness between said balls and said screw and nut grooves.

References Cited in the file of this patent

UNITED STATES PATENTS

| Number | Name | Date |
|---|---|---|
| 438,320 | Lieb | Oct. 14, 1890 |
| 477,642 | Brunthaver | June 28, 1892 |
| 888,619 | Kelly | May 26, 1908 |
| 992,897 | Nichols et al. | May 23, 1911 |
| 1,500,270 | Rodel | July 8, 1924 |
| 2,195,799 | Parsons | Apr. 2, 1940 |
| 2,447,439 | Thompson | Aug. 17, 1948 |
| 2,502,066 | Tanner | Mar. 28, 1950 |